US010176783B2

(12) United States Patent
Travers et al.

(10) Patent No.: US 10,176,783 B2
(45) Date of Patent: Jan. 8, 2019

(54) INTERACTIVE WEARABLE AND PORTABLE SMART DEVICES

(71) Applicant: Vuzix Corporation, Rochester, NY (US)

(72) Inventors: Paul J. Travers, Honeoye Falls, NY (US); Michael McCrackan, Pittsford, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 14/759,086

(22) PCT Filed: Jan. 4, 2014

(86) PCT No.: PCT/US2014/010260
§ 371 (c)(1),
(2) Date: Jul. 2, 2015

(87) PCT Pub. No.: WO2014/107629
PCT Pub. Date: Jul. 10, 2014

(65) Prior Publication Data
US 2015/0340010 A1  Nov. 26, 2015

Related U.S. Application Data

(60) Provisional application No. 61/749,236, filed on Jan. 4, 2013.

(51) Int. Cl.
*G09G 5/00* (2006.01)
*G09G 5/12* (2006.01)
(Continued)

(52) U.S. Cl.
CPC ............. *G09G 5/12* (2013.01); *G02B 27/017* (2013.01); *G06F 3/005* (2013.01); *G06F 3/012* (2013.01);
(Continued)

(58) Field of Classification Search
CPC . G02B 2027/0178; G06F 3/011; G06F 1/163; G06F 3/012; G06F 3/0482;
(Continued)

(56) References Cited

U.S. PATENT DOCUMENTS 8,184,068 B1  5/2012  Rhodes et al.
8,190,749 B1  5/2012  Chi et al.
(Continued)

FOREIGN PATENT DOCUMENTS

CN    102428665 A    4/2012
CN    102638724 A    8/2012
(Continued)

OTHER PUBLICATIONS

International Search Report and Written Opinion dated May 27, 2014 in corresponding PCT International Application No. PCT/US2014/010260.
(Continued)

*Primary Examiner* — Hau H Nguyen
(74) *Attorney, Agent, or Firm* — Thomas B. Ryan; Harter Secrest & Emery LLP

(57) ABSTRACT

A computer-driven wearable display device incorporating a display engine for presenting virtual images to wearers is interconnected with a computer-driven portable display device incorporating a display screen for presenting real images to the wearers of the wearable display device. An applications management and communication system including an external manager application residing on the portable display device provides for managing and launching applications residing on the wearable display device through the user interface of the portable display device.

14 Claims, 18 Drawing Sheets

(51) Int. Cl.
  *G06F 3/0481* (2013.01)
  *G06F 3/14* (2006.01)
  *G06F 3/00* (2006.01)
  *G06F 3/01* (2006.01)
  *G02B 27/01* (2006.01)
  *G06F 3/0482* (2013.01)

(52) U.S. Cl.
  CPC ........ *G06F 3/0482* (2013.01); *G06F 3/04817* (2013.01); *G06F 3/14* (2013.01); *G06F 3/1454* (2013.01); *G02B 2027/014* (2013.01); *G02B 2027/0138* (2013.01); *G02B 2027/0178* (2013.01); *G02B 2027/0187* (2013.01); *G06F 3/1423* (2013.01); *G06F 3/1462* (2013.01); *G09G 2354/00* (2013.01); *G09G 2370/025* (2013.01)

(58) Field of Classification Search
  CPC .......... G06F 1/1673; G06F 3/01; G06F 3/014; G06F 3/0346; G09G 2354/00
  See application file for complete search history.

(56) References Cited

U.S. PATENT DOCUMENTS

| | | | | |
|---|---|---|---|---|
| 8,937,534 | B2* | 1/2015 | Kreiner | ............... H04M 1/7253 340/12.22 |
| 8,947,322 | B1* | 2/2015 | Chi | ..................... G02B 27/017 345/156 |
| 2003/0001823 | A1 | 1/2003 | Oya et al. | |
| 2005/0195129 | A1 | 9/2005 | Yamazaki et al. | |
| 2008/0320190 | A1 | 12/2008 | Lydon et al. | |
| 2011/0044438 | A1 | 2/2011 | Wang et al. | |
| 2012/0203862 | A1 | 8/2012 | Tayeb et al. | |
| 2012/0299870 | A1 | 11/2012 | Chi et al. | |
| 2013/0007668 | A1 | 1/2013 | Liu et al. | |
| 2013/0017789 | A1* | 1/2013 | Chi | ........................ G02B 27/01 455/41.2 |

FOREIGN PATENT DOCUMENTS

| | | |
|---|---|---|
| EP | 2230605 A1 | 9/2010 |
| JP | 2000-347596 A | 12/2000 |
| JP | 2003-087363 A | 3/2003 |
| JP | 2007-115167 A | 5/2007 |
| JP | 2011-186856 A | 9/2011 |
| JP | 2011-211384 A | 10/2011 |

OTHER PUBLICATIONS

International Preliminary Report on Patentability dated Jul. 7, 2015 in corresponding PCT International Application No. PCT/US2014/010260.
Extended European Search Report from corresponding European Application No. 14735292.6.
Office Action in counterpart Japanese Patent Application No. 2015-551795 dated Nov. 13, 2017.
First Office Action in counterpart Chinese Patent Application No. 201480012619 dated Nov. 2, 2016.
Second Office Action in counterpart Chinese Patent Application No. 201480012619 dated Sep. 5, 2017.

* cited by examiner

| | | | Phone | | | | Smart glasses | | | | | | | |
|---|---|---|---|---|---|---|---|---|---|---|---|---|---|---|
| | App | Action | Screen | GPS | 3G | WiFi | BT | B1 | B2 | B3 | Mic | Spkr | QWVGA | Cam | IMU |
| 1 | Hands Free | None | N | N | Y | N | Y | Y | Y | Y | Y | Y | N | N | N |
| 2 | Advanced Hands Free | UI | N | N | Y | Opt | Y | Y | Y | Y | Y | Y | N | Y | N |
| 3 | SMS | None | N | N | Y | Y | Y | N | N | Y | Y | Y | Y | N | Y |
| 4 | Navigation | UI | Y | Y | Y | Y | Y | Y | Y | Y | Y | Y | Y | Y | Y |
| 5 | Video Recording | UI | Y | | | | | | | | Opt | Opt | | | |
| 6 | Gaming | | | | | | | | | | | | | | |
| 7 | AR | | | | | | | | | | | | | | |

FIG. 8

INTERACTIVE WEARABLE AND PORTABLE SMART DEVICES

FIELD OF THE INVENTION

The invention relates to wearable displays that incorporate or are connected to another device, such as a smartphone, having computing power, preferably in communication with a network such as the internet or a wireless communication system.

BACKGROUND AND SUMMARY OF THE INVENTION

For decades wearable displays have been referred to as HMDs (Head Mounted Displays) because of their bulky size and odd appearance, attributable among other things to the micro displays and the conventional refractive and or reflective optics that they employ. These HMD's are large, heavy, and practically impossible to make into fashion eyewear.

The technology for wearable computing has gained in processing power comparable to that of modern desktop computers and is now small enough to fit in the frames of glasses. In addition, optics and display systems for wearable displays have become both smaller in size and higher in resolution to the point where it is possible to place hi-definition (HD) displays and the needed optics in standard glasses-styled frames. With the advances in these technologies, complete operating systems can be incorporated into wearable display systems, creating a new product category, referred to as "smart glasses"; much like the addition of computing power to portable phones, now referred to commonly as "smartphones".

The compact computing power of smart glasses supports the possibility of loading applications into the smart glasses and running the applications resident in the smart glasses. In addition, such smart glasses can be connected to a smartphone or computer for supporting wearable computing that can be fully cloud connected, with the smartphone, for example, acting as a user interface and running its own application synchronized to the smart glasses. To make this work, there is a need to connect the wearable display to the wearable computer, e.g., smartphone, and then to manage applications that are designed to work on both devices and in concert with each other.

The smart glasses could be arranged to run applications independently or in concert with applications running on their paired (connected) computing devices, e.g., smartphones. Preferably the applications running in both the smartphones and connected computing devices are synchronized or otherwise arranged to work together.

One version of the invention features a computing system for wearable displays. A computer-driven wearable display device incorporates a display engine for presenting virtual images to wearers and a communication and video processor engine including a computer processor, together with an operating system for running applications residing in computer memory, and a communications device for linking the computer processor to external devices. A computer-driven portable display device incorporates a display screen for presenting real images to the wearers of the wearable display device, computing power for running resident applications and communicating with external devices, and a user interface for interacting with the resident applications. An applications management and communication system includes an external manager application residing on the portable display device for managing and launching applications residing on the wearable display device through the user interface of the portable display device.

Another version of the invention features a method of interconnecting a computer-driven wearable display device incorporating a display engine for presenting virtual images to wearers with a computer-driven portable display device incorporating a display screen for presenting real images to the wearers of the wearable display device. The method includes linking applications residing on the wearable display device with applications residing on the portable display device through an external manager application residing on the portable display device, and sending input to one or more of the applications residing on the wearable display device through a user interface residing on the portable display device.

BRIEF DESCRIPTION OF THE SEVERAL VIEWS OF THE DRAWINGS

FIG. 8 is a chart of exemplary applications for the smart glasses together with a smartphone.

DETAILED DESCRIPTION OF THE INVENTION

Figure 1:
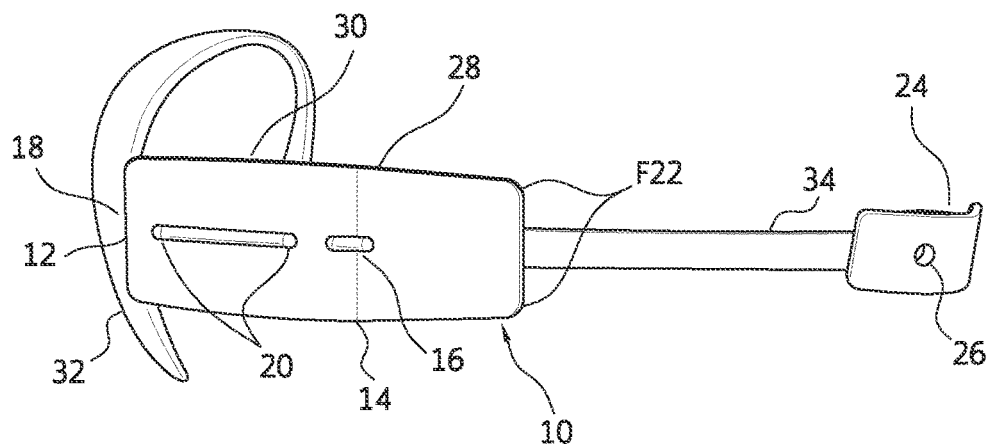
FIG. 1 is a perspective side view of a monocular wearable display device referred to as smart glasses.
Figure 2:
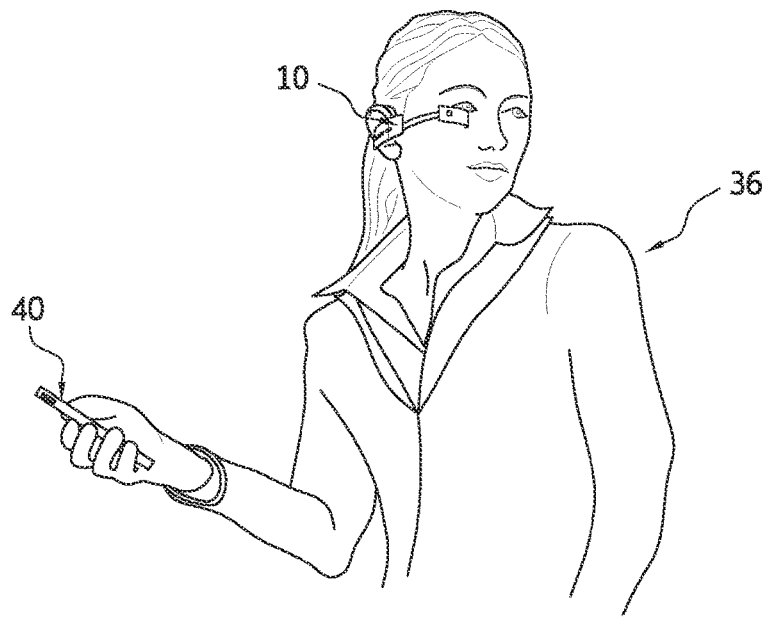
FIG. 2 is an image of the monocular wearable display device as intended to be worn by a wearer also holding a portable display device such as a smartphone.

One example of a monocular wearable display device 10 with an over-ear mounting of a type referred to as smart glasses is depicted in FIG. 1 in isolation and as intended to be worn by a wearer 36 in FIG. 2.

As shown in FIG. 1, the monocular smart glasses 10 can be arranged to include a select "Soft Key" 12, a power button (On/Off/Sleep) 14, two LED lights (Blue and White) 16, a charging socket 18, two navigation "Soft Keys" (Volume Up/Down) 20, microphones 22, a compact display engine 24, a camera 26, a micro SD slot 28, an ear-hook 30, and an ear-pad 32. The compact display engine 24 is preferably supported on an adjustable length boom 34 and can include tilt control at the end of the boom for positioning the display with respect to the wearer's eye.

The compact display engine 24 is preferably capable of high contrast and brightness suitable for both indoor and outdoor use. The display 24 is integrated with both the camera 26 for detecting information within the intended field of view of the wearer 36 and a processing engine to wirelessly connect the smart glasses 10 to a smartphone 40. Both the processor within the smart glasses 10 and the processor within the smartphone 40 can be operated using the Android OS (operating system), which enables the smart glasses 10 to achieve a wide range of functionality and to run a wide range of applications.

As depicted in FIG. 2, the smart glasses 10 can be designed to work wirelessly with the smartphone 40 or other smart device such as a tablet or a PC that can be connected to the internet. As such, the wearer 36 of the smart glasses 10 is also the user of the smartphone 40. The smart glasses 10 can incorporate sensor technology to provide an interactive environment that can merge virtual information with the real world. For example, with integrated camera and head-tracking technology, the smart glasses 10 can broaden a wearer's sensory perception by recognizing their environment and real world position, while recording and transmitting what the wearer 36 sees. The built-in camera 26 allows for environment, object, and people recognition and tracking for augmented reality (AR) implementations. Downloadable applications can be supported providing discrete access to applications from email to the web, location relevant data, first-person augmented and mixed reality applications, and personal video recording, and visual navigation, as well as gaming.

Figure 3:
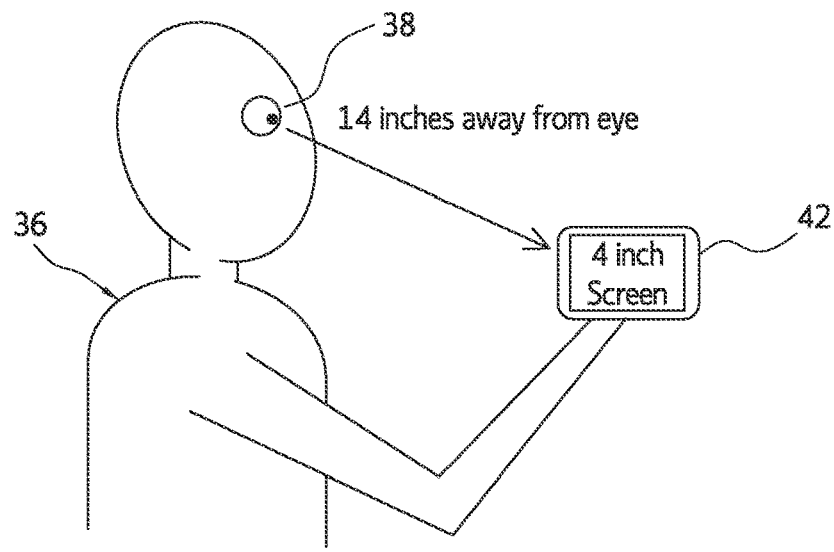
FIG. 3 is a schematic depiction of the wearer illustrating a virtual image presented by the wearable display device to the wearer.

As schematically depicted in FIG. 3, the virtual image presented to the wearer's eye 38 can be arranged to model the appearance of a smartphone display screen. For example, the smart glasses display 24 can be arranged to present to the wearer 36, a virtual image having a size matching the size of a four-inch display screen 42 held approximately 14 inches away from the wearer 36.

Figure 4:
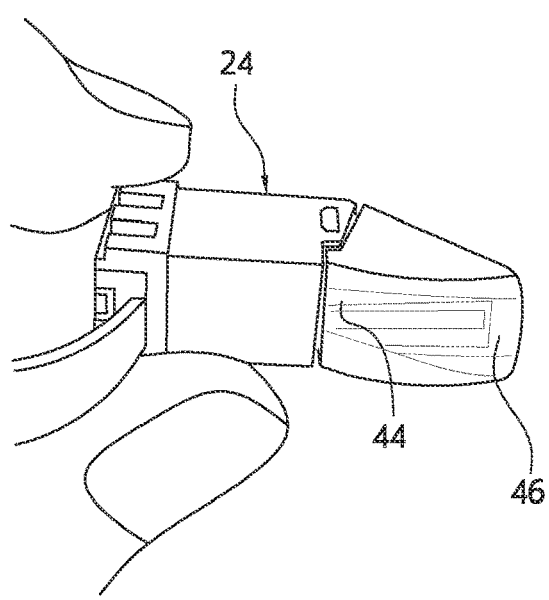
FIG. 4 is an image of an optical display engine of the monocular wearable display device.

The optical display engine 24, as shown in FIG. 4, preferably has a high resolution WQVGA Color display 44 with a diagonal field of view of 14 degrees and is left or right eye useable. For example, the display engine 24 can have a 440×320 array of pixels with a response time of 60 hertz. The contrast is preferably at least 225:1 with 24 bit color. Brightness is preferably greater than 1000 nits and more preferably greater than 2000 nits. The optics preferably include a micro prism 46 for projecting a virtual image into an eyebox preferably having a height of approximately 6 millimeters and a width of approximately 8 millimeters.

Figure 5:
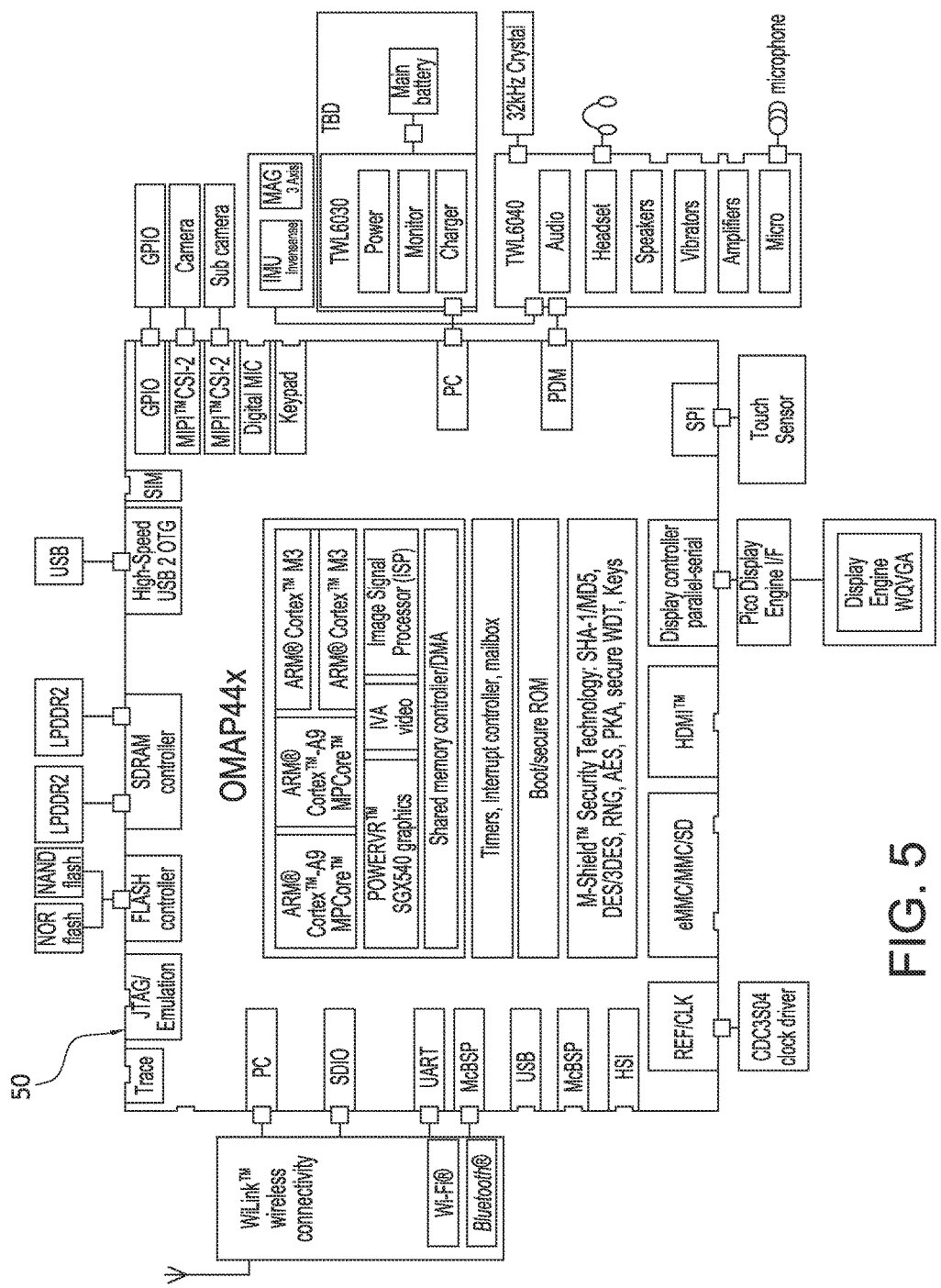
FIG. 5 is a diagram of processor arranged for use in the smart glasses.

A diagram of an OMAP 4 8840 processor 50 arranged for use in the smart glasses 10 is presented in FIG. 5. The host device software can be iOS/Android, Windows, or Mac. For example, a fully optimized Android 4.0.3 (Ice Cream Sandwich) can be used, which is designed to run on a wide range of devices including phones, tablets, and TVs. The memory can be built into an OMAP 4430 processor operating at 1 GHz with 1 GB RAM or an OMAP 4 8840 processor operating at 800 MHz having 4 GB Flash memory.

Figure 6:
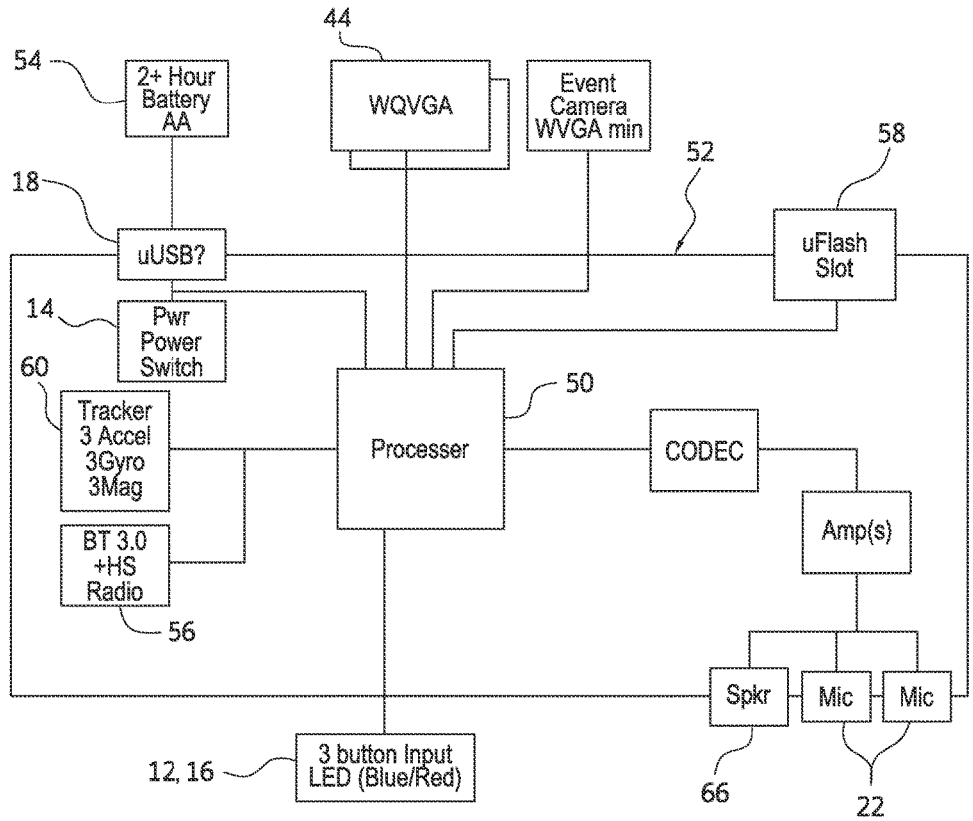
FIG. 6 is a diagram of a communications & video processor engine of the smart glasses in which the processor of FIG. 5 is the central hub of the engine.

A communications & video processor engine 52 diagramed in FIG. 6 shows the processor 50 as the central hub of the engine 52 with connections to a power source 54 via the charging socket 18, the high resolution WQVGA Color display 44, a communication device 56, an external memory input 58, a head tracker 60, the event camera 26, the control buttons 12 and 16 and an interface for a speaker 66 and the microphones 22. Connectivity options for power and communications include uUSB: control/Power/Upgrade, Wi-Fi 802.11b/g/n, and Bluetooth BT 3.0 or 4.0. The built-in camera 26 can be a HD 720p camera with a 16:9 aspect ratio, H.264 compressed over Bluetooth, video recording capable, and a Micro CF slot supporting up to 16 GB. The integrated head tracker 60 preferably provides measures over three to six degrees of freedom, including a three-axis accelerometer, a three-axis gyro, and an integrated compass with Bluetooth interface. The ear speaker 66 is preferably a hands-free integrated noise suppression speaker and the microphones 22 are preferably noise cancelling microphones. The integrated button controls can also include the power control button 14 and the volume up, and volume down control buttons 20. The external memory input 58 can be provided through an external flash slot, e.g., Micro Flash. For on-board power, an integrated battery preferably supports five to eight hours of typical use with preferably at least two hours of display operation and one hour of display and camera operation. In addition to over-ear mounting, such as via the ear-hook 30, the mounting options include over-head and behind-head mounting.

Figure 7A:
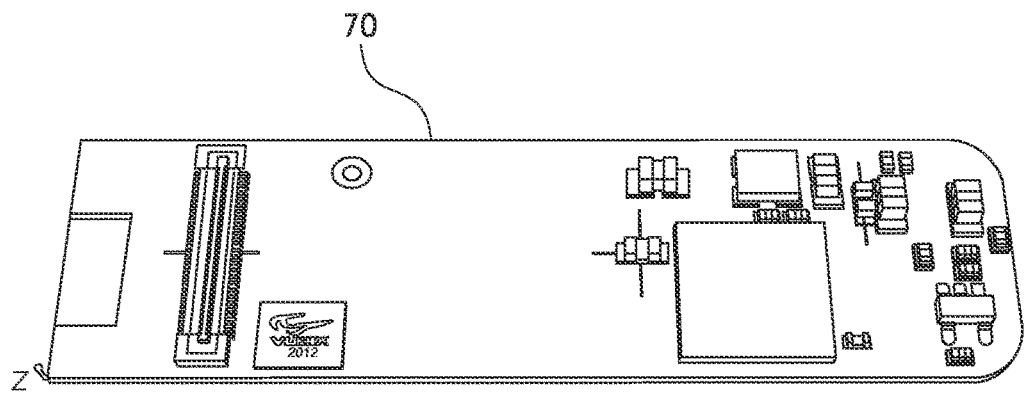
FIGS. 7A and 7B depict the layout of the printed circuit board for the communications & video processor engine.
Figure 7B:
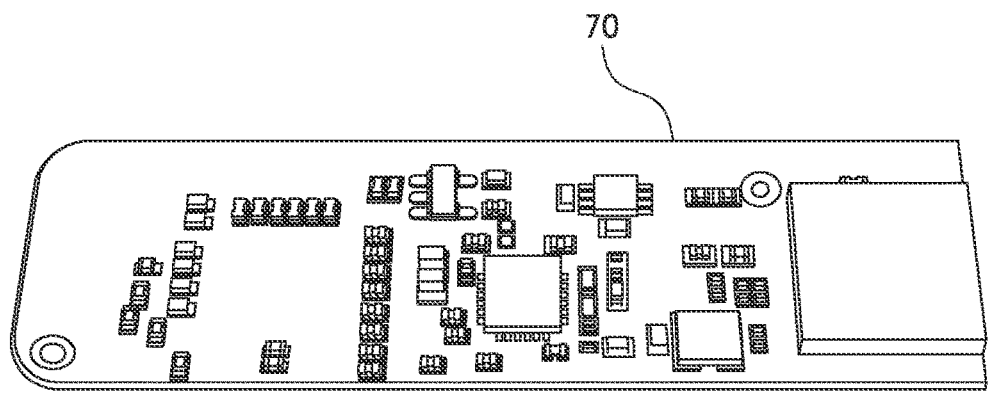

Typical layouts of a printed circuit board 70 for the communications & video processor engine 56 are presented in FIGS. 7A and 7B.

Built with the basic functionality of a wireless "hands free" for a cell phone, the smart glasses 10 have advanced capabilities with the built-in WQVGA display 44, the 16:9 camera 26, and the OMAP 4 processor 50 running Android ICS OS or other operating system. These features allow the smart glasses 10 to not only answer the smartphone 40 but to browse the web, video record special events, and add thousands of applications from gaming to work.

Utilizing Wi-Fi and Bluetooth radio for communications, the smart glasses 10 operate as a standard "hands free" (through the BT radio) device 56 to the smartphone 40, and the smart glasses 10 can operate as a cloud-connected computing device (through the Wi-Fi radio). With the Android ICS OS running on the smart glasses 10, software app development for the smartphone 40 is comparable to writing for any standard Android device. Apps can either run independently in the smart glasses 10 or in concert with the smartphone 40.

To charge the smart glasses 10, a charging doc can be provided, such as through the uUSB connection 18. The smart glasses 10 can also use the uUSB port to serve as the firmware update link to a PC or Mac.

The smart glasses 10 are preferably enabled with "out of the box" capabilities to perform advanced hands-free functions along with integrated navigation through applications such as Google maps. Built-in video recording to an internal flash or the HD micro flash support can also be provided.

A chart of example applications for the smart glasses 10 together with the smartphone 40 is presented in FIG. 8. An application management and communications system can be arranged to:

ensure that all applications (apps) are in sync between the two devices (e.g., smart glasses 10 and smartphone 40);

enable the purchase of apps from multiple internet based app stores and manage potentially multiple apps between the two devices 10 and 40;

enable cloud communications and synchronization from and through the two devices 10 and 40; and create a cohesive user interface that runs and controls the apps in the various modes that need to be supported.

Within various different modes of operation, computing functions can be variously distributed between smart glasses and smartphones as set forth by example in the following table.

| Mode | Smart Glasses | Smartphone | Comments |
|---|---|---|---|
| 1 | Basic OS | Application | An application running in the smartphone communicates directly with an OS (operating system) in the smart glasses. |
| 2 | Application | No Application | A standalone application runs in the smart glasses and the smartphone is not needed. |
| 3 | Application | Application | Applications on both the smart glasses and the smartphone run in synchronism with each other. |

Smartphones, which typically include high-resolution touch displays, already provide highly developed graphical interfaces for downloading and executing a large number of applications and many such applications can be adapted for use with smart glasses. For example, anything displayed on the smartphone screens could also be displayed in the smart glasses 10. However, since the smartphones themselves have both computing power and high resolution screens, the various applications running on smartphones, such as the smartphone 40, could variously be adapted to run independently on the smartphones or to run on the smartphones in conjunction with applications running on the smart glasses 10. Graphical user interfaces can also be incorporated into the smartphone 40, such as by incorporating cameras and tracking technology to detect or display information within the intended fields of view of the smart glasses 10 or to detect movements of the wearers' eyes 38.

The device ecosystem of the smart glasses 10 preferably includes applications running on either or both the smart glasses 10 or the smartphone 40. For example, an external manager application arranged to run on Android or iOS phones or tablets can be arranged to manage and launch applications that run on the smart glasses 10. The external manager application can be launched from an icon displayed on the phone 40 or tablet and presents an array of icons designed to launch specific applications such as presented in the list below.

Home—Returns the wearer to the home screen

Keyboard—Starts a built in app that allows keyboard entry for the smart glasses

Trackpad—Starts a built in app that allows trackpad functionality for the smart glasses Mirror—Allows the manager application to mirror the external and smart glasses displays Camera—Starts a built in app to allow video and pictures to be taken by the smart glasses Social Media Interface—Connects with (Twitter, Facebook, YouTube Sharing) feeds Shopping Bag—Starts a built in app for the smart glasses to automatically barcode and scan for better prices Streaming Media—Starts a built in app to start streaming music and video Setup—Setup function for both the resident manager application and the smart glasses AppStore—Function to go to a designated AppStore A local manager application, which can be run by an Android or iOS operating system residing in the smart glasses 10, provides a similar interface for the smart glasses 10. The main screen of the smart glasses 10 can display icons for applications that can be launched by one or both of the local manager application or the external manager application. For example, icons can be displayed on the viewing screen of the smart glasses having status indicators as listed below.

Bluetooth On; Bluetooth device connected

GPS Active; Receiving location data from GPS

WiFi Active

Time

Battery a Battery is Charging

Battery is partially drained

Battery is low

Battery is very low

Phone

Call in Progress

Missed Call

Call on Hold

Microphone is On, Muted

Sound Off, Muted

No MicroSD Card Installed

Camera On; Recording

Connected via USB Cable

New Message (Text or Multimedia Message)

Uploading Data; Downloading Data; Downloading Complete

Data Syncing

Figure 9:
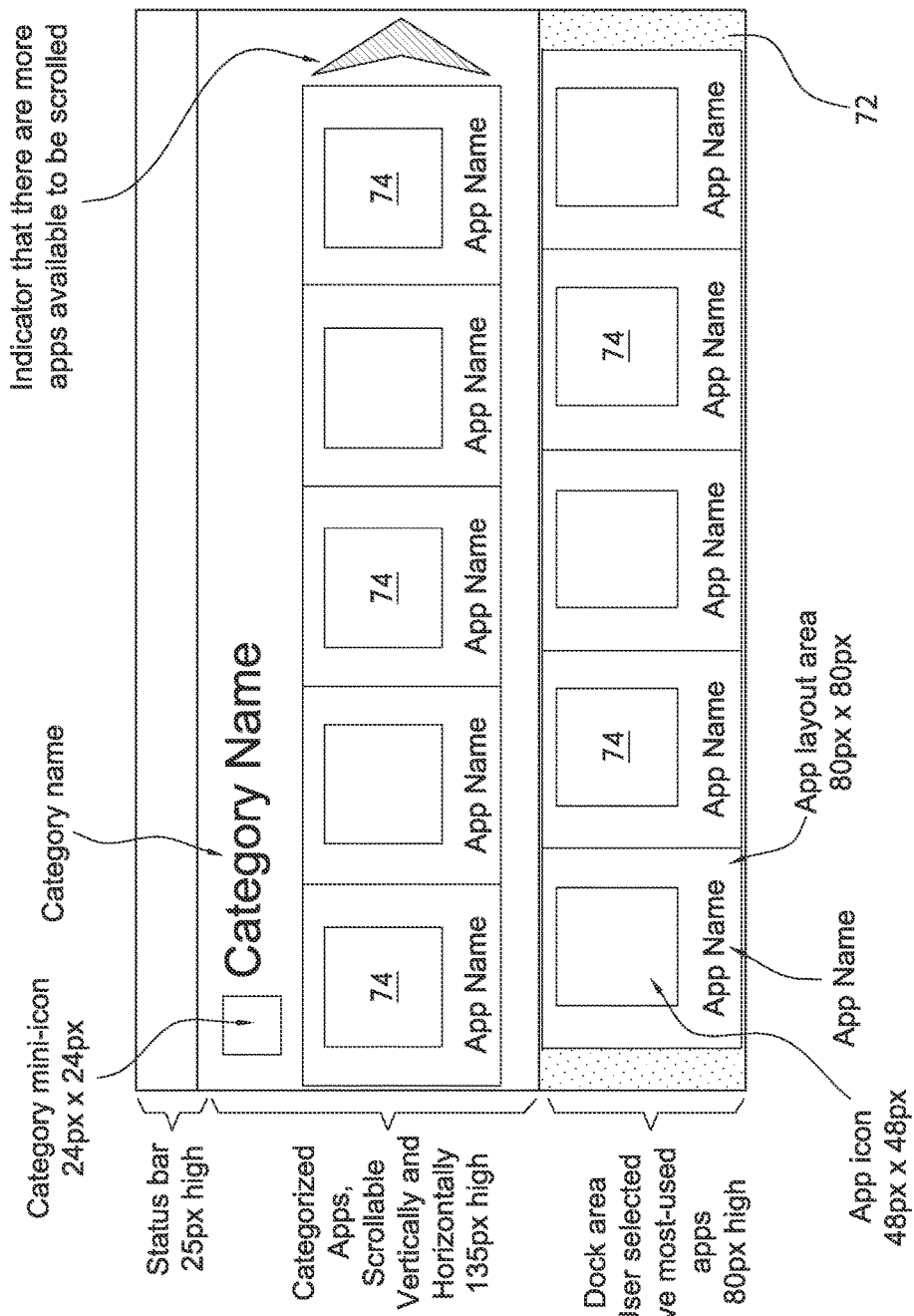
FIG. 9 is a diagram of a typical layout of the display screen of the smart glasses

A typical layout of a virtual display screen 72 of the smart glasses 10 is shown in FIG. 9. The layout can include, for example (from top of screen): a 25 px status bar—controlled by OS, a 135 px app scrolling area with indicator for horizontal scroll (the apps displayed as icons 74 can be categorized automatically by app store category, or by the wearer), and a fixed area on the lowest 80 pixels that carries, for example, up to five apps 74 that are most likely to be used. Regardless of where a wearer is looking through the categories of apps, this bottom area can be arranged to always show these apps. The app layout area can be 80 px×80 px, in which a 48 px×48 px icon and the app title is centered.

Figure 10:
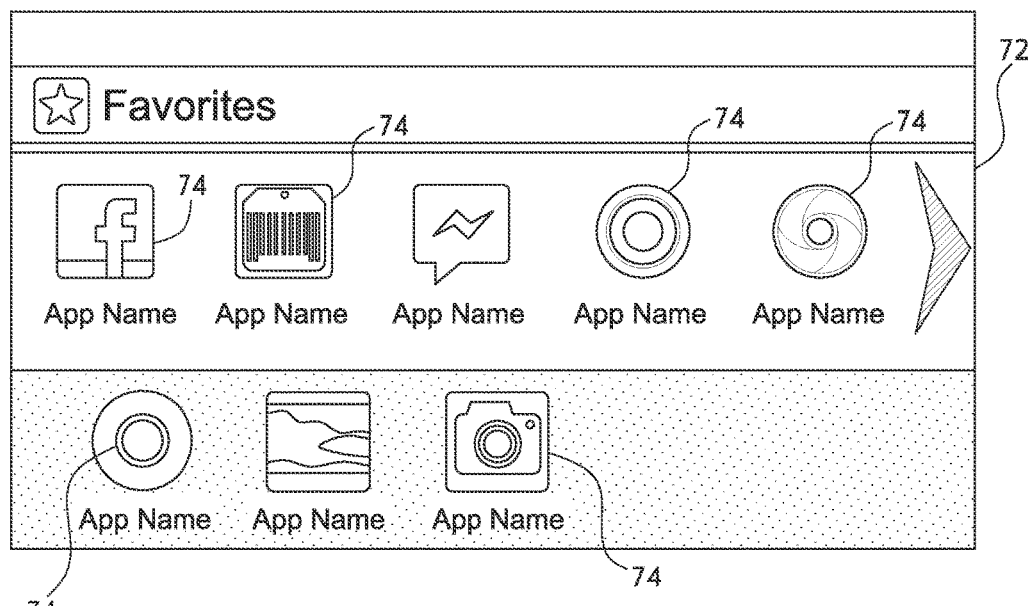
FIG. 10 is a screen-shot of such a typical layout of the smart glasses display screen as diagramed in FIG. 9.
Figure 11:
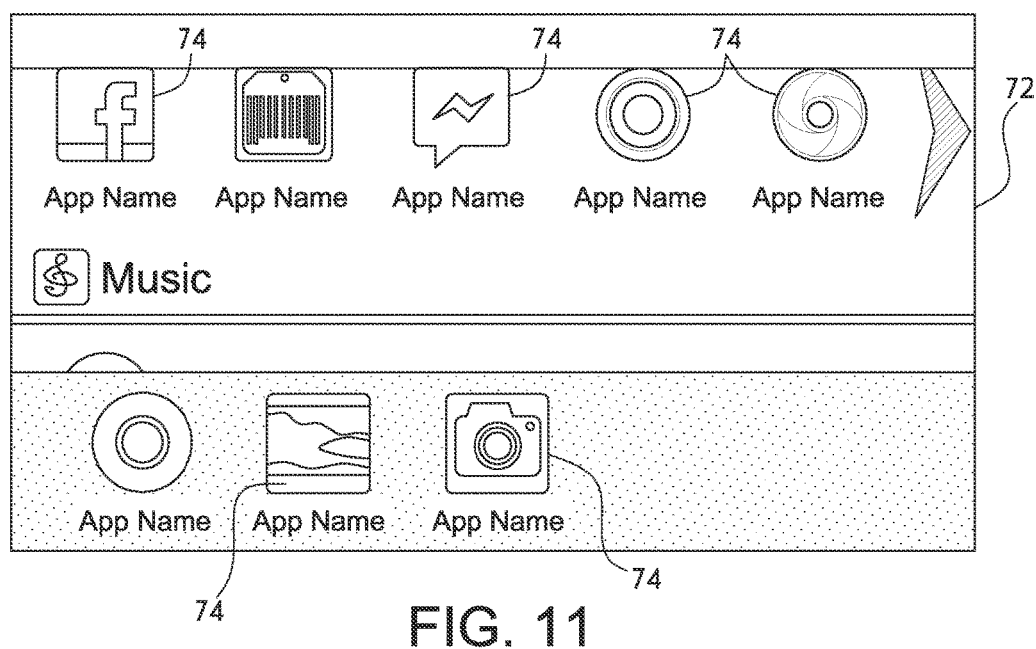
FIG. 11 is a screen-shot of the display screen of FIG. 10 in mid-vertical scroll.

A screen-shot of such a typical layout of the smart glasses virtual display screen 72 is shown in FIG. 10. Another shot of the virtual display screen 72 in mid-vertical scroll is reproduced in FIG. 11.

The wearer 36 can use the buttons, e.g., 16, on the smart glasses 10 to traverse from one app 74 to another. In mirror mode, the wearer 36 can run or control applications running on the smart glasses 10. For further integration, the smart glasses 10 can include sister applications that are synced with applications running on the external device, such as the smartphone 40.

Some of the basic functions that can be carried out on the smart glasses 10 include: charging the device, power on/power off, Bluetooth pairing with the external device, WiFi tethering, updating OS on the smart glasses, running Android SG controlling Applications, streaming audio, taking pictures, capturing video, and running gesture engines.

While the smart glasses 10 are intended to be fully functional when connected to an external power source, the on-board battery 54 may require charging—itself from an external power source. To charge the battery aboard the smart glasses 10, the wearer 36 can connect the smart glasses 10 via the micro USB port 18 into a portable USB battery pack, a wall charger, or USB port on their computer.

The wearer 36 can preferably power on the device 10 whether it is connected to an external power source or not. By pressing the power button 14 for a predetermined length of time, e.g., one second, the smart glasses 10 begin a power up sequence. A designated logo can appear on the smart glasses display while the smart glasses 10 are powering/booting up. If the battery is low, a low-battery indicator can appear. If the smart glasses 10 were previously paired, the communication link 56, e.g., Bluetooth, can be activated.

The wearer 36 can preferably power off the smart glasses 10 whether they are connected to an external power source or not. The power button 14 can be pressed for a predetermined period of time, e.g., one second, and a shutdown menu can appear on the smart glasses display. Then, the softkey, e.g., 12, can be selected to choose among the menu items, or the choices can be made through another button or input mode on the smart glasses 10, e.g., a volume button.

The wearer 36 can connect the smart glasses 10 with an external device, e.g., smartphone 40 via Bluetooth pairing. For example, the Bluetooth setting on the external device, e.g., smartphone 40, can be enabled and the wearer 36 can add, search, or scan for devices including the smart glasses 10, which when found can be selected.

To install an application 74 on the smart glasses 10 or to update the OS, the smart glasses 10 can be connected via the mini USB into the USB port on an external computer. The application or updated OS could also be loaded on the smart glasses 10 via the wireless internet connection 56. A range of applications including the latest version of the OS is preferably made available through an AppStore website that is selectable as an icon displayed by the smart glasses 10. Preferably, all applications and personal information on the smart glasses 10 remains persistent during the uploading of new applications or the updating of the OS.

Enhanced hands-free operation of the smart glasses 10 can be enabled to receive incoming calls to an external phone that is paired with the smart glasses 10. For example, the smart glasses 10 can ring, vibrate, or display an indicator when a call is waiting. External phone contact information can also appear in the display. To answer the call, the wearer 36 can activate a softkey, e.g. 12 to select an icon or use a voice-activated command, such as "Answer Call". The call will remain in session until it is disconnected. The wearer 36 can adjust the volume or mute the microphone 22 and disconnect the call in a similar manner. The smart glasses' display can also be used for video conferencing.

To place phone call through the paired smartphone 40, the wearer 36 can select a phone application and scroll through a contact list on the display. The wearer 36 can activate a softkey, e.g., 12, or use a voice-activated command such as "Make a Call", or "Call (Contact Name)", or "Call (Number)", to initiate the call. An outgoing call indicator can appear in the smart glasses' display until the call is disconnected.

Figure 12A:
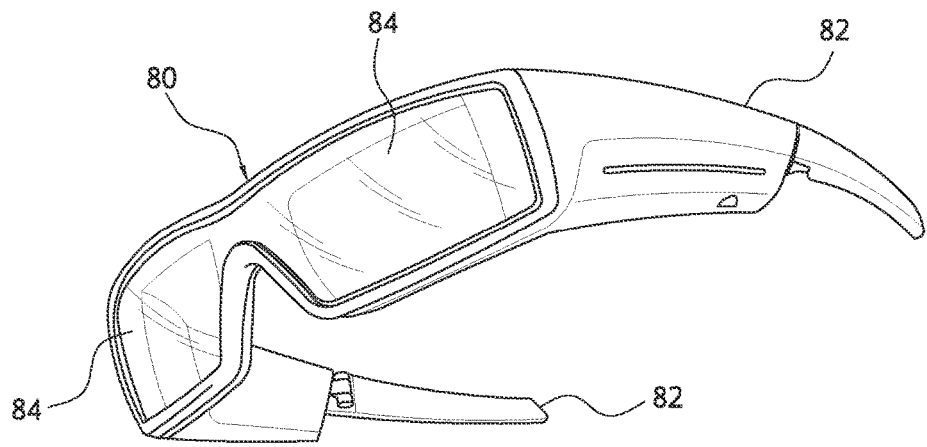
FIGS. 12A and 12B are front and back perspective views of binocular smart glasses with a conventional two-bow frame.
Figure 12B:
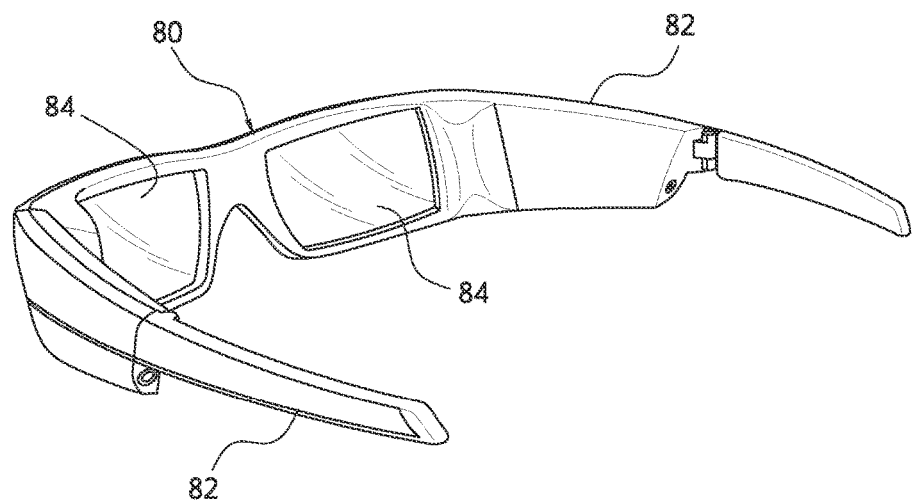

Binocular smart glasses 80 with a conventional two-bow frame 82 are depicted in front and back perspectives in FIGS. 12A and 12B. These smart glasses 80 include integrated qHD display engines and ultrathin waveguide optics and can look like designer sunglasses.

The compact display engine is capable of high contrast and brightness suitable for both indoor and outdoor use. The output of the display engine is relayed into see-through 1.4 mm thin clear polymer waveguide lenses 84 with input and output hologram structures on their surfaces. The light propagates down the waveguides 84 and then two-dimensionally expands into the wearer's eyes, creating an image that is mixed and overlaid onto their real world view.

The binocular smart glasses 80 are designed to work with smart devices such as cellphones, tablet and PCs, which can be connected to the internet. Capabilities similar to those already described for the monocular smart glasses 10 can be incorporated into the binocular smart glasses 80 and for sake of brevity are not repeated here.

Figure 13:
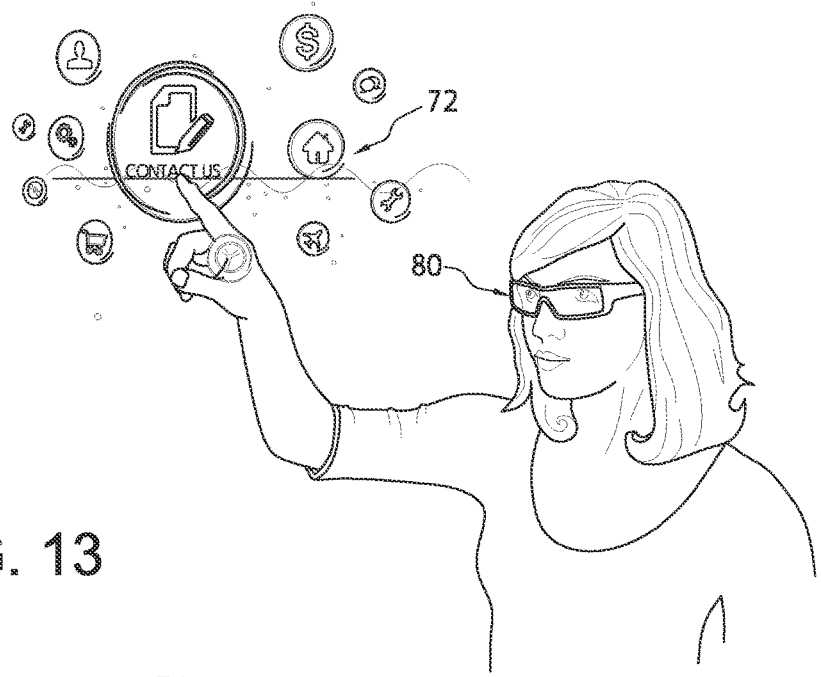
FIG. 13 depicts an interactive virtual image display as seen by a wearer of the smart glasses merging virtual information with the real world view through the glasses.

In addition, as depicted in FIG. 13, the smart glasses 80 are preferably interactive and merge virtual information with the real world view through the glasses—indoors or outdoors at night or in broad daylight. Integrated head tracking and options for multiple camera technologies, the smart glasses 80 can broaden the wearer's sensory perception across a greatly expanded light spectrum, recognize their environment and real world position, while recording and transmitting what the wearer sees. A built-in camera allows for environment, object, and people recognition and tracking for AR augmentation, providing, for example, private access to data and location relevant data, first-person augmented and mixed reality applications, and AR recognition of objects and markers to assist in maintenance and repair applications.

Figure 14:
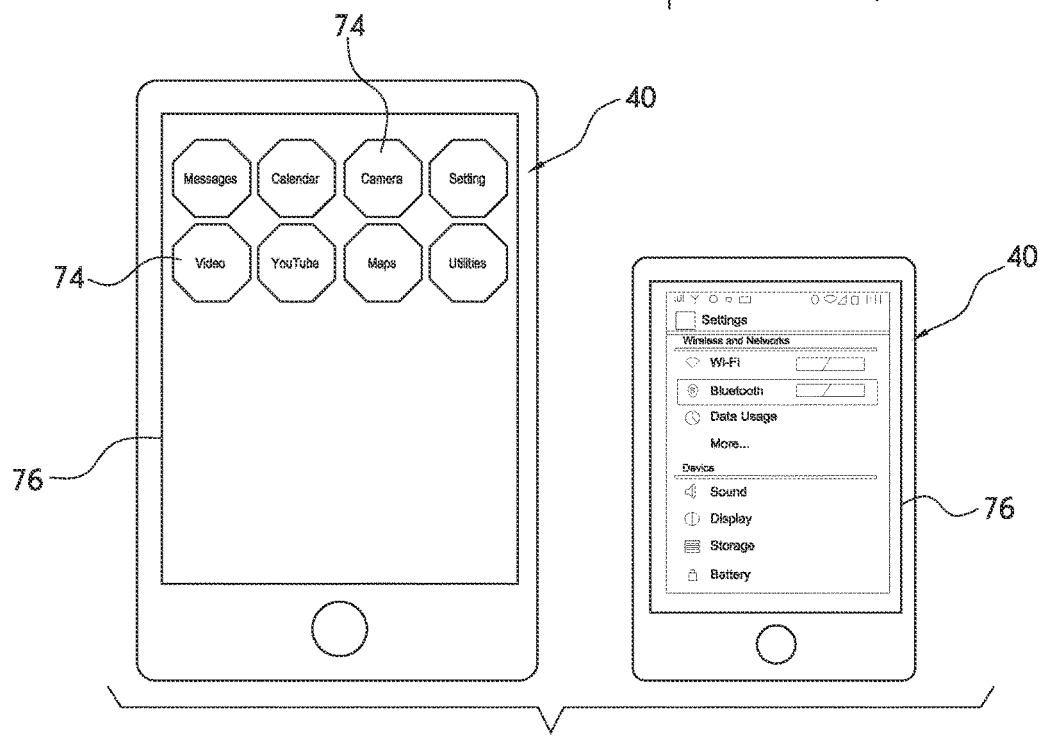
FIG. 14 depicts a pairing one of the smart glasses to a smartphone.

Example features include:
Display resolution: 960×540 qHD color displays
    Field of View (diagonal): 30 degrees
    64" display as seen at 10 ft. (~3 m)
    Brightness >250 nits—full color
    85% to 90% optical transmission of outside world
OMAP4430 at 1 GHz, 1 GB RAM, HDMI connector, Wi-Fi 802.11b/g/n, Bluetooth, 915 MHz RF receiver, 8 GB SD card storage
Fully optimized Android Ice Cream Sandwich 4.0.3
1080p H264 decoding
Adobe Flash 11.x support
USB 2.0 micro OTG, compatible with Android adb server
NFC and LVDS features disabled but on the board
Support for camera based gesture engine interface
Hardware DRM for PlayReady
Fully optimized Ubuntu 11.10 with all hardware built-in glasses for hi-speed video, media and AR control support and in-field "applet" upgrades
HD camera
    720P 16:9 aspect ratio
    USB 2.0 output
    H.264 compressed over Bluetooth
User selectable lens tint
    Removable, clip-on/clip-off
Integrated touch sensors in temples
    OSD, Volume, Etc.
Integrated head tracker
    3-degree of freedom head tracking
    Integrated compass
Optional battery
Up to 3 hours run time
    Belt clip
Connectivity:
    uUSB: Control/Power
    Wi-Fi and Bluetooth: Control, compressed camera video, microphone
Audio:
    Removable noise suppression headphones
    Noise cancelling microphone
Host device software The view in FIG. 14 illustrates pairing one of the smart glasses 10 or 80 to the smartphone 40, showing two different activity screens 76 of the paired smartphone 40.

Figure 15:
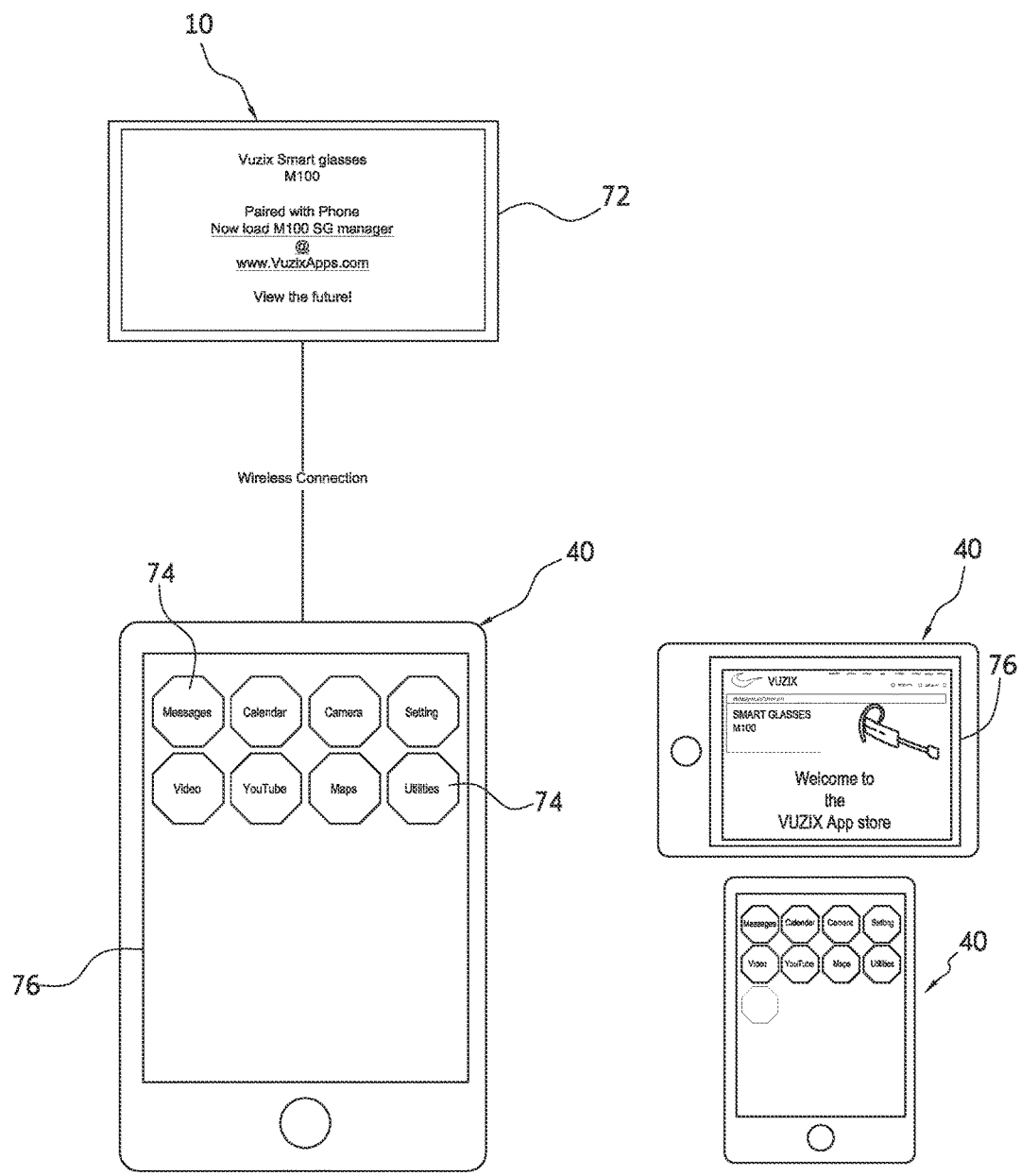
FIG. 15 depicts installing a manager application for the smartphone.
Figure 16:
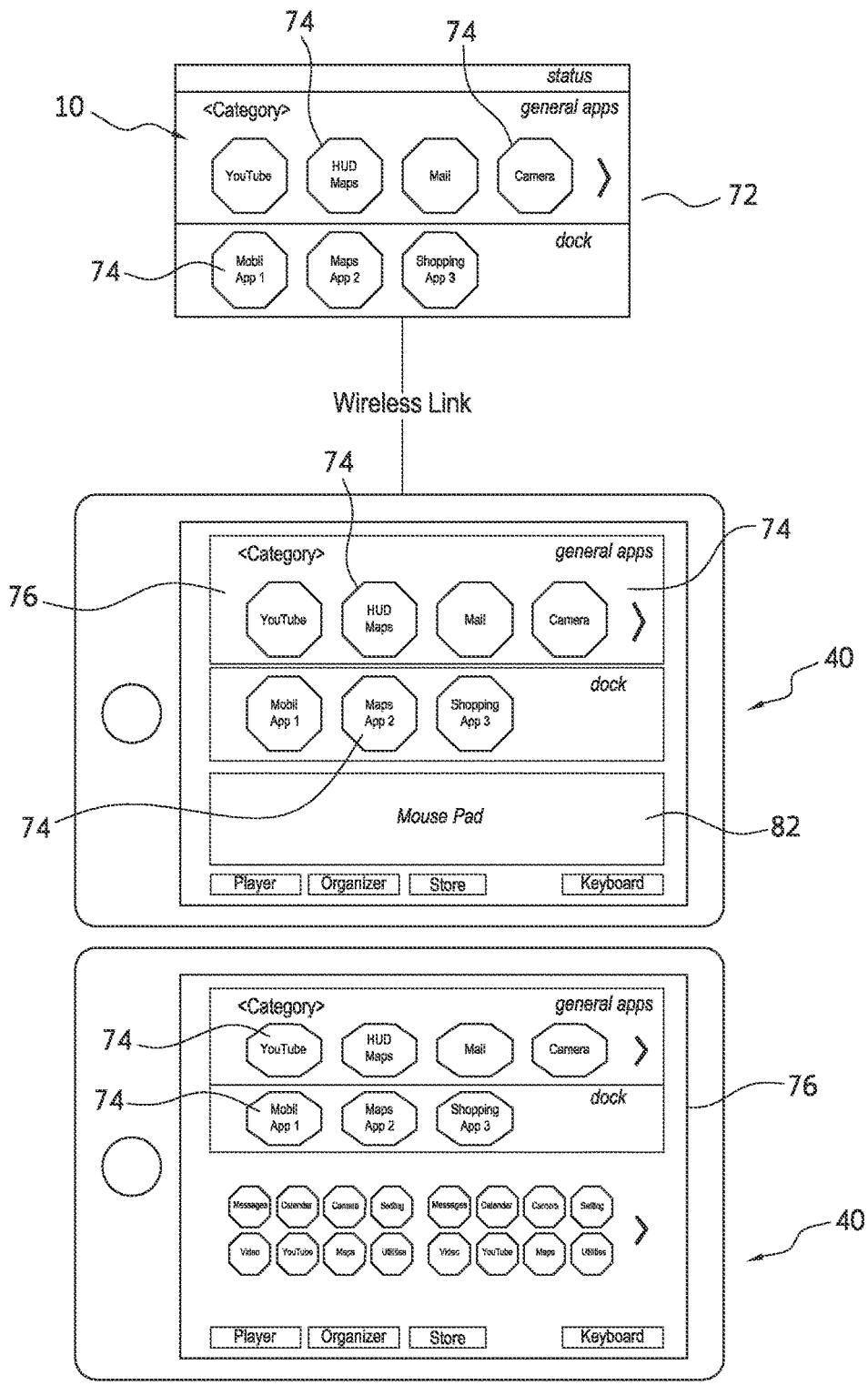
FIG. 16 depicts an organization of the apps between the smart glasses and the external device, e.g. smartphone with the shaded icons residing on both the smartphone and the smart glasses.

The view in FIG. 15 depicts installing a manager application for the smartphone 40. The manager application can provide a remote desktop to the smart glasses 10 and also acts as the user input to apps 74 on the smart glasses 10, for example through a mouse pad 82 or keyboard. In addition, the manager application can organize the apps 74 between the smart glasses 10 and the external device, e.g. smartphone 40. The shaded app icons 74 on the activity screen 76 of the smartphone 40 shown in FIG. 16 correspond to the apps 74 on the virtual display screen 72 of the smart glasses 10.

Figure 17:
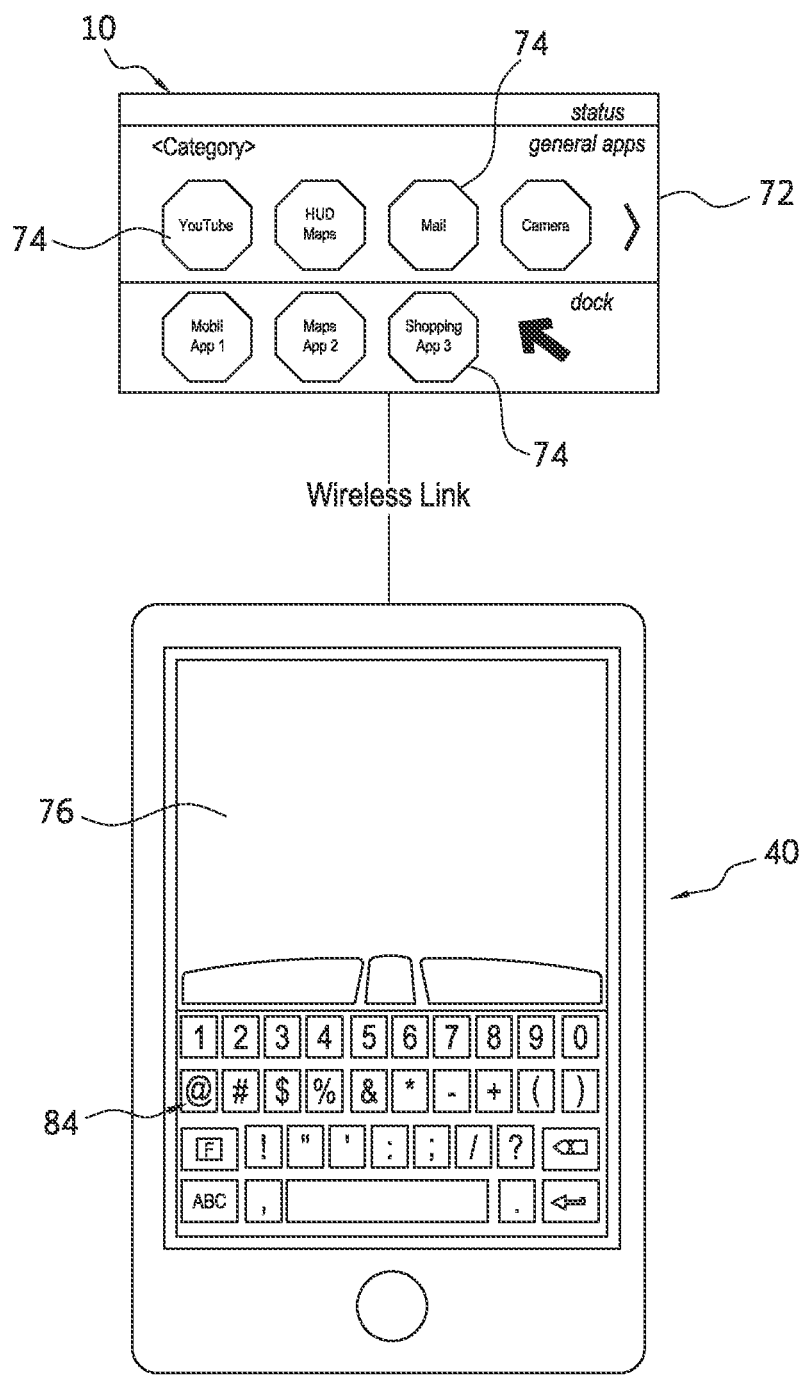
FIG. 17 depicts wearer input to the smart glasses with the external smartphone running keyboard/mouse over a wireless link to the smart glasses.
Figure 18A:
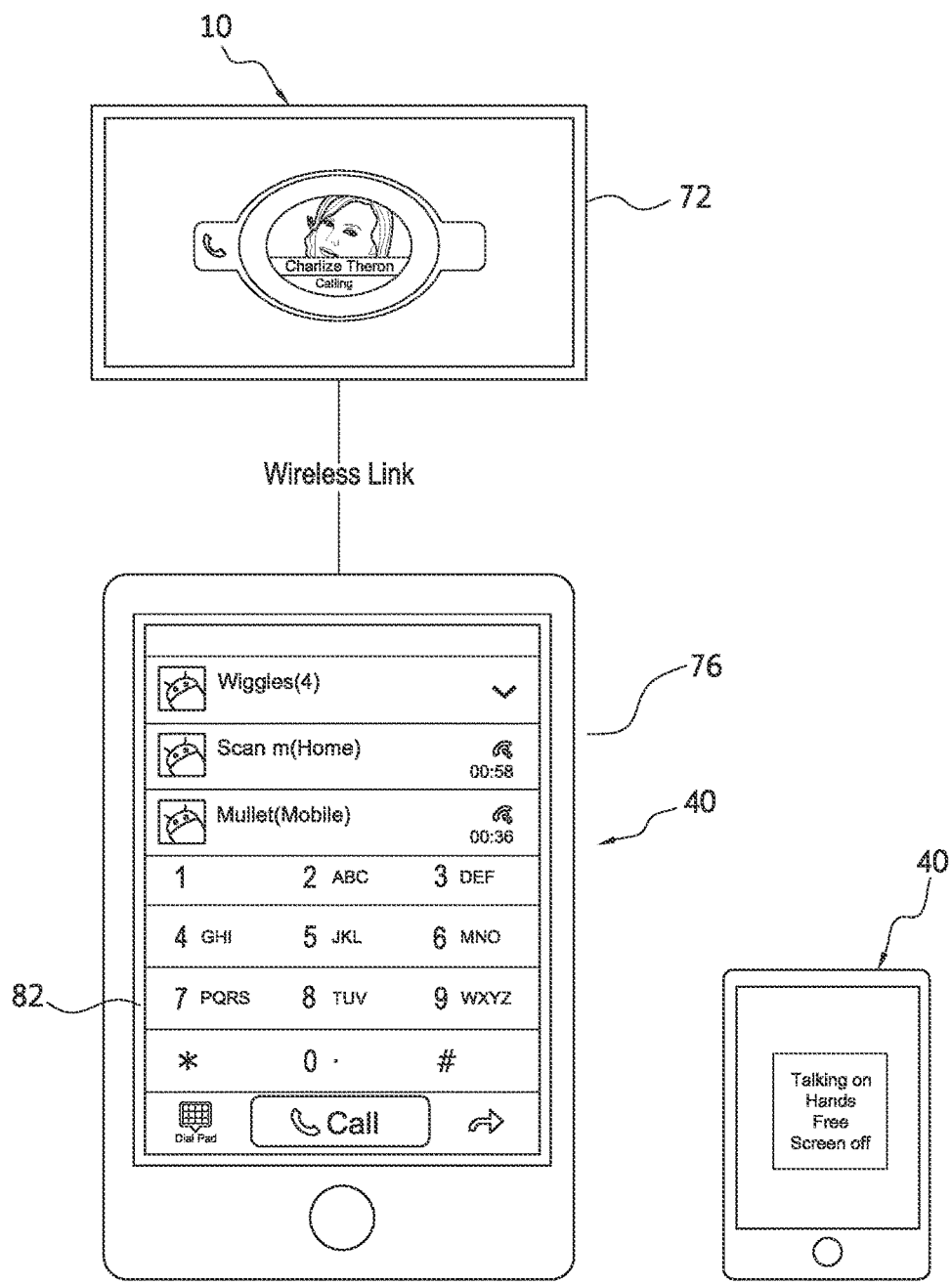
FIGS. 18A-E depict cooperative functionalities of the smart glasses with the smartphone.
Figure 18B:
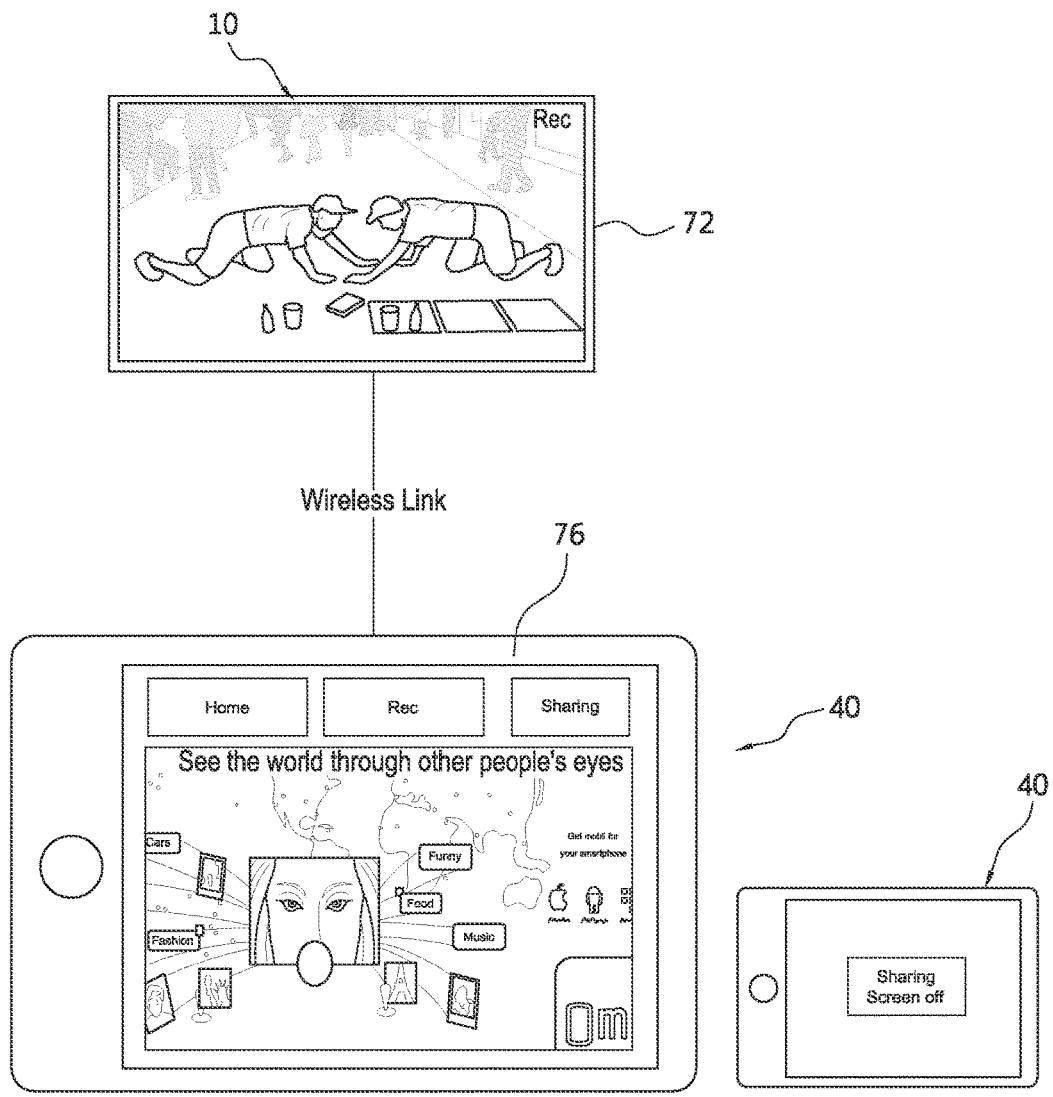
Figure 18C:
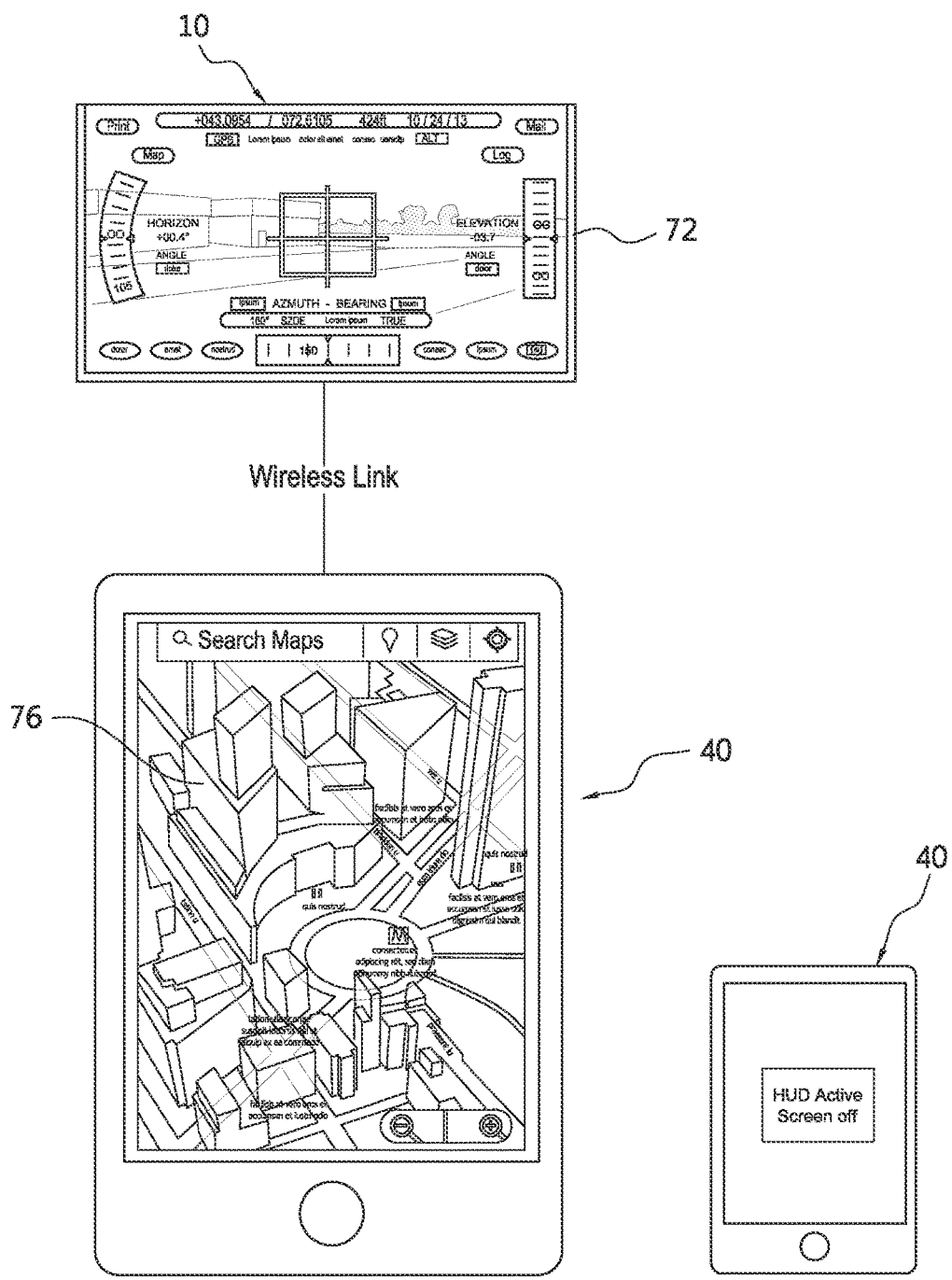
Figure 18D:
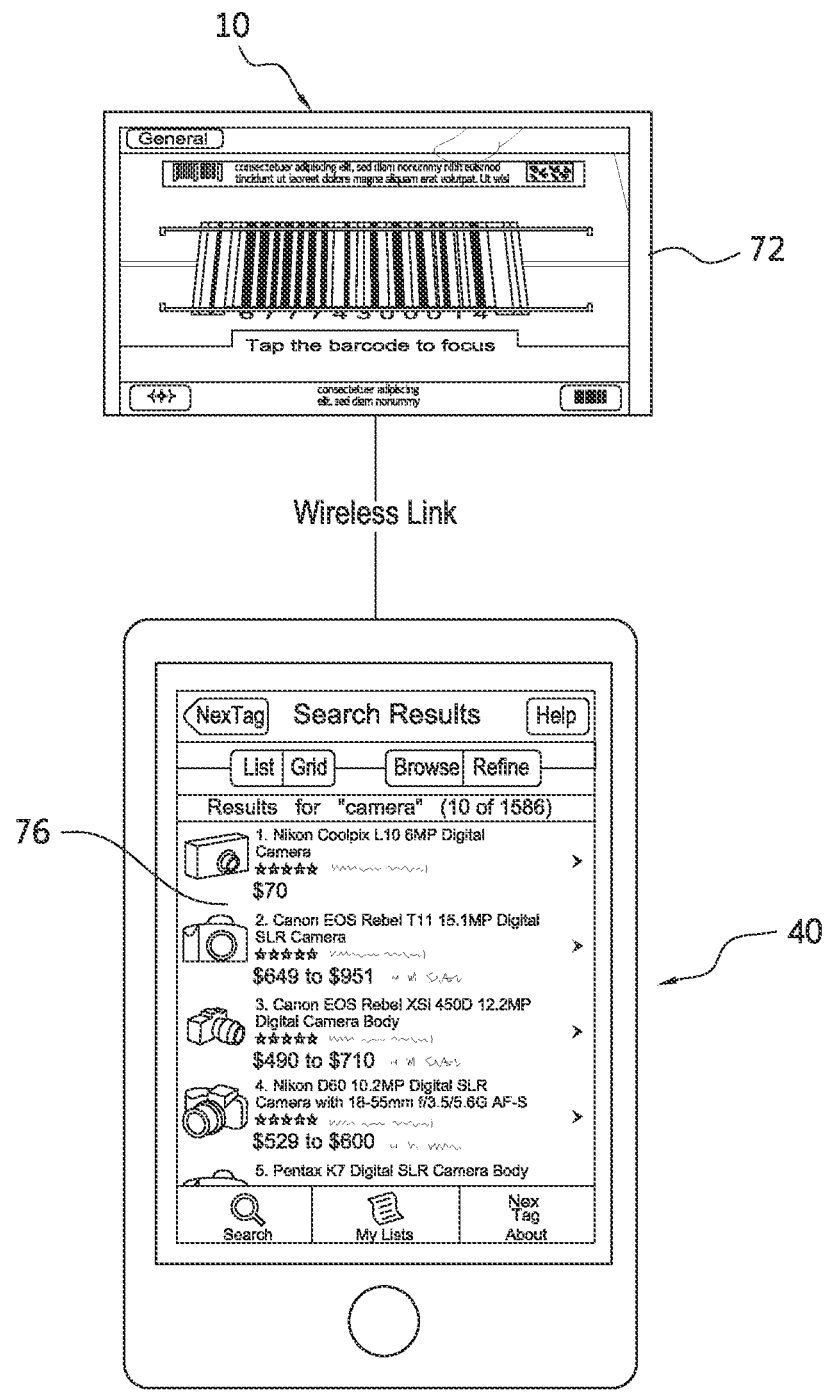
Figure 18E:
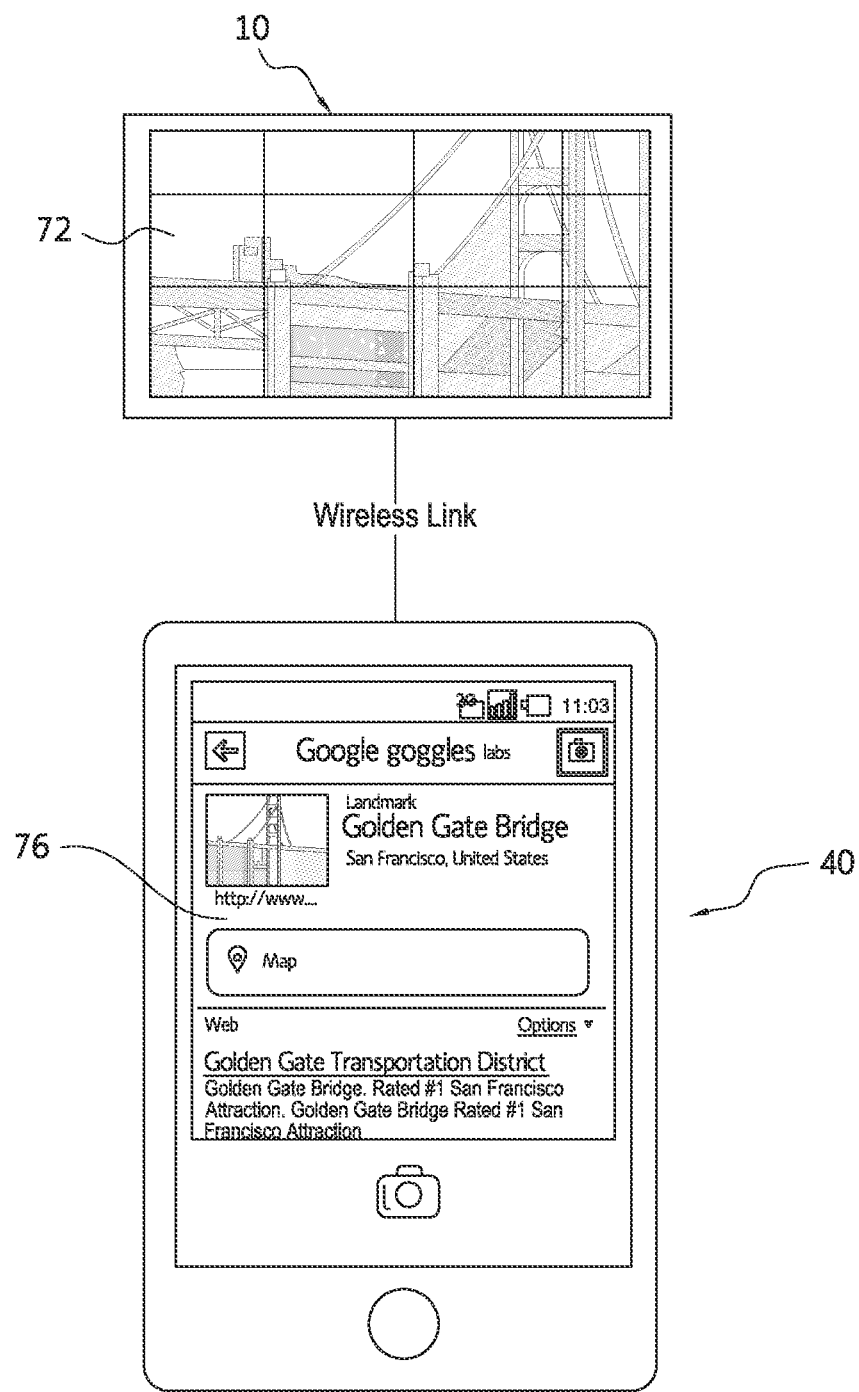

The view in FIG. 17 depicts wearer 36 input to the smart glasses 10 with the external smartphone 40 running a keyboard/mouse 84 over Bluetooth or WiFi.

The views in FIGS. 18A-E depict hand-free operations of the smartphone 40 through the smart glasses 10, including "seeing the world through another's eyes", running a map applications, shopping, and imaged feature identification.

The invention in one or more of its preferred embodiments allows wearers to manage, purchase and interface apps 74 between the wearable display (smart glasses 10) and an external device such as the smartphone 40, a tablet or a computer. In this sense, the smart glasses 10 function as peripherals to the external devices. However, the smart glasses 10 can also be used as stand-alone devices. With the addition of cameras and gesture engines or other environmental input devices, the smart glasses 10 can provide a complete interface for carrying out processing and communication applications.

The invention claimed is:

1. A computing system for wearable displays comprising:
a computer-driven wearable display device providing a real-world view through the wearable display device to a wearer while incorporating a display engine for presenting virtual images to the wearer, a communication and video processor engine including a computer processor and computer memory, an operating system for running applications residing in computer memory, and a communications device for linking the computer processor to external devices;
a computer-driven portable display device incorporating a display screen for presenting real images to the wearer of the wearable display device, a computer processor for running resident applications, a communications device for communicating with external devices, and a user interface for interacting with the resident applications;
an applications management and communication system including an external manager application residing on the portable display device for managing and launching the applications residing on the wearable display device through the user interface of the portable display device independently or in concert with the applications residing on the portable display device, and for organizing the applications between the wearable display device and the portable display device, and;
the wearable display device including an integrated camera head-tracking technology residing on the wearable display device to acquire real-world information about the wearer's real-world view and real-world position, the portable display device being arranged to input the real-world information about the wearer's real-world view and position to applications running on the portable display device; and
the wearable display device being arranged for displaying visual navigation information recognized from the real-world information about the wearer's real-world view and position overlying the wearer's real-world view through the wearable display device in the augmented reality implementation.

2. The system of claim 1 in which the external manager application presents an array of icons appearing within both the virtual images of the wearable display device and the real images of the portable display device, and in which the icons are designed to launch applications on the wearable display device.

3. The system of claim 1 in which the external manager application provides a remote desktop to the wearable display device to provide input through the user interface of the portable display device to the applications residing on the wearable display device.

4. The system of claim 1 in which the external manager application residing on the portable display device is arranged to send input to applications running on the wearable display device.

5. The system of claim 1 in which the portable display device has a further connection to a network of computers providing a communications path for the wearable display device to exchange information with the network of computers.

6. The system of claim 5 in which the portable display device is one of a smartphone, a tablet, and a PC.

7. The system of claim 1 in which an applications management and communication system includes a local manager application residing on the wearable display device for managing and launching applications residing on the wearable display device.

8. The system of claim 7 in which the wearable display device includes a user interface for interacting with applications running on the wearable display device.

9. The system of claim 8 in which the portable display device includes one or more I/O devices operated by one or more of the applications residing on the portable display device, and the local manager application provides for at least partially controlling the I/O devices residing on the portable display device through the user interface of the wearable display device.

10. The computing system of claim 1 in which the information recognized from the real-world information about the wearer's real-world view includes a recognition of people.

11. A method of interconnecting (a) a computer-driven wearable display device providing a real-world view through the wearable display device while incorporating a display engine for presenting virtual images to a wearer and (b) a computer-driven portable display device incorporating a display screen for presenting real images to the wearer of the wearable display device for an augmented reality implementation, comprising steps of:
storing a plurality of applications in a computer memory of the computer-driven wearable display device and a plurality of applications in a computer memory of the computer-driven portable display device;
using an external manager application residing on the computer-driven portable display device to launch one or more of the applications stored in the computer memory of the computer-driven wearable display device independently or in concert with the applications residing on the computer-driven portable display device, and to organize the applications between the computer-driven wearable display device and the computer-driven portable display device;

operating an integrated camera and head-tracking technology of the computer-driven wearable device to acquire real-world information about the wearer's real-world view and real-world position;

arranging the computer-driven portable display device to input the real-world information about the wearer's real-world view and position to applications running on the computer-driven portable display device; and arranging the computer-driven wearable display device to display visual navigation information recognized from the real-world information about the wearer's real-world view and position overlying the wearer's real-world view through the computer-driven wearable display device in the augmented reality implementation.

12. The method of claim 11 including a step of displaying an array of icons within both the virtual images of the wearable display device and the real images of the portable display device, wherein the icons displayed by the wearable display device are designed to launch the one or more of the applications stored in the computer memory of the computer-driven wearable display device.

13. The method of claim 11 including steps of
sending input to one or more of the applications residing on the wearable display device through a user interface residing on the portable display device, and
providing a remote desktop to the wearable display device to provide input through the user interface of the portable display device to one or more of the applications residing on the wearable display device.

14. The method of claim 11 in which the display information recognized from the real-world information about the wearer's real-world view includes a recognition of people.

* * * * *